US009633088B1

(12) United States Patent
Nagy et al.

(10) Patent No.: US 9,633,088 B1
(45) Date of Patent: Apr. 25, 2017

(54) EVENT LOG VERSIONING, SYNCHRONIZATION, AND CONSOLIDATION

(71) Applicant: Voalte, Inc., Sarasota, FL (US)

(72) Inventors: Michael E. Nagy, Sarasota, FL (US); Joshua J. Burroughs, Sarasota, FL (US); Donnie C. Fletcher, Sarasota, FL (US)

(73) Assignee: Voalte, Inc., Sarasota, FL (US)

( * ) Notice: Subject to any disclaimer, the term of this patent is extended or adjusted under 35 U.S.C. 154(b) by 0 days.

(21) Appl. No.: 14/918,459

(22) Filed: Oct. 20, 2015

(51) Int. Cl.
*G06F 15/173* (2006.01)
*G06F 17/30* (2006.01)
*G06F 17/28* (2006.01)
*H04L 29/08* (2006.01)
*G06F 12/00* (2006.01)

(52) U.S. Cl.
CPC .... *G06F 17/30548* (2013.01); *G06F 17/2818* (2013.01); *G06F 17/30551* (2013.01); *H04L 29/08072* (2013.01)

(58) Field of Classification Search
CPC ............ A63F 2300/105; A63F 2300/69; A63F 13/00; A63F 13/212; A63F 13/211; A63F 13/213; A63F 13/217; A63F 13/812; A63F 13/215; A63F 13/216; A63F 13/23; A63F 13/355; A63F 13/828; G06K 9/00342; G06K 2009/00738; G06K 9/00711
USPC .................. 709/203, 223–229, 250; 719/318
See application file for complete search history.

(56) References Cited

U.S. PATENT DOCUMENTS

| | | | | |
|---|---|---|---|---|
| 2008/0301135 A1* | 12/2008 | Alves | ................. | G06F 17/30442 |
| 2009/0070785 A1* | 3/2009 | Alvez | ..................... | G06F 9/541 719/318 |
| 2009/0070786 A1* | 3/2009 | Alves | ..................... | G06F 9/541 719/318 |
| 2009/0158274 A1* | 6/2009 | Roberts | ................. | G06F 19/327 717/178 |
| 2013/0218670 A1* | 8/2013 | Spears | ............... | G06Q 30/0252 705/14.47 |
| 2014/0157288 A1* | 6/2014 | Wong | .................. | G06F 11/3476 719/318 |
| 2014/0172534 A1* | 6/2014 | Spears | ............... | G06Q 30/0226 705/14.27 |

(Continued)

Primary Examiner — Zarni Maung
(74) Attorney, Agent, or Firm — Long Technology Law, LLC; Joseph L. Long (57) ABSTRACT

Systems and methods can support log synchronization associated with a complex event handler. An event log can support storing prior event indicators. A new event indicator may be received. Temporal indicators associated with the new event indicator may be analyzed to establish consistent relative ordering with respect to prior event indicators. A synchronized timestamp may be generated in response to analyzing the temporal indicators. The new event indicator may be translated into a canonical form. The translated event indicator may be stored into the event log according to the synchronized timestamp. A rule associated with the complex event handler may be evaluated to identify a stored event dependency within a rule condition of the rule. The event log may be searched to match the translated event indicator against the stored event dependency. The rule may be triggered, and its action executed, in response to satisfying the rule condition.

20 Claims, 5 Drawing Sheets

(56) References Cited

U.S. PATENT DOCUMENTS

2015/0301921 A1* 10/2015 Kumar ................... G06F 9/542
714/38.1
2016/0094620 A1* 3/2016 Darling .................. H04L 67/10
709/204

* cited by examiner

EVENT LOG VERSIONING, SYNCHRONIZATION, AND CONSOLIDATION

BACKGROUND

Event logs are computer files that record events and other information occurring in a network of interconnected systems and devices. Events entering a log file are generally sourced from multiple systems. Assembling and arranging events in a log file in a meaningful way typically requires interpreting information presented differently from the multiple systems. This is very difficult when the events are in different formats and use different timestamp conventions, or even worse when they are based on different time-zones. Clock skew between systems may make relative time ordering necessary. Logging events in a coherent way is also complicated when the systems may indicate versions of events or data using unsynchronized version numbers, but it may be desirable that a strict monotonic ordering be maintained between the different sources.

There is a need in the art for event log management technology that can collect, analyze, classify, and update events and other data from disparate sources into a coherent, consolidated, combined and uniformly-formatted event log in order to implement certain rules for actions to be taken upon occurrence of certain patterns of events. Such solutions would be particularly applicable in large, information-driven enterprises such as healthcare facilities or systems thereof.

SUMMARY

In certain example embodiments described herein, methods and systems can support log synchronization associated with a complex event handler. An event log may be provided to support storing prior event indicators associated with the complex event handler. A new event indicator may be received. Temporal indicators associated with the new event indicator may be analyzed to establish consistent relative ordering with respect to prior event indicators. A synchronized timestamp may be generated in response to analyzing the temporal indicators. The new event indicator may be translated into a canonical form. The translated event indicator may be stored into the event log according to the synchronized timestamp. A rule associated with the complex event handler may be evaluated to identify a stored event dependency within a rule condition of the rule. The event log may be searched to match the translated event indicator against the stored event dependency. The rule may be triggered in response to satisfying the rule condition. An action associated with the rule may be executed in response to triggering the rule.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

The methods and systems described herein enable various efficient techniques for combining multiple homogeneous and heterogeneous event sources into a coherent, consolidated, combined, and uniformly-formatted event log. The techniques may support formatting uniform header data, such as metadata or time/datestamps, supporting log entries to retain stable ordering under standard sorts. In this process the original time/datestamps and source of the log information may be preserved for reference, but a uniform header provided in a canonical, or standardized, form may be associated with each log entry to support stable post-combination sorting and filtering. The uniform header may comprise a time/datestamp in a common, or centralized, time zone. The common time zone may be derived from one or more of the source log files, or specified as a parameter of the event consolidation process. The time/datestamp may be derived from each original log line in such a manner as to preserve relative time-order within and across various log entry sources being combined. Log entries, which are multi-line or otherwise cumbersome in format, may be represented within the combined log in a manner that preserves their coherence. For example, such log entries may be kept grouped together, thereby maintaining the order and continuity of their constituent lines, or records, within the grouping.

The functionality of the various example embodiments will be explained in more detail in the following description, read in conjunction with the figures illustrating the program flow. Turning now to the drawings, in which like numerals indicate like (but not necessarily identical) elements throughout the figures, example embodiments are described in detail.

Example System Architectures

Figure 1:
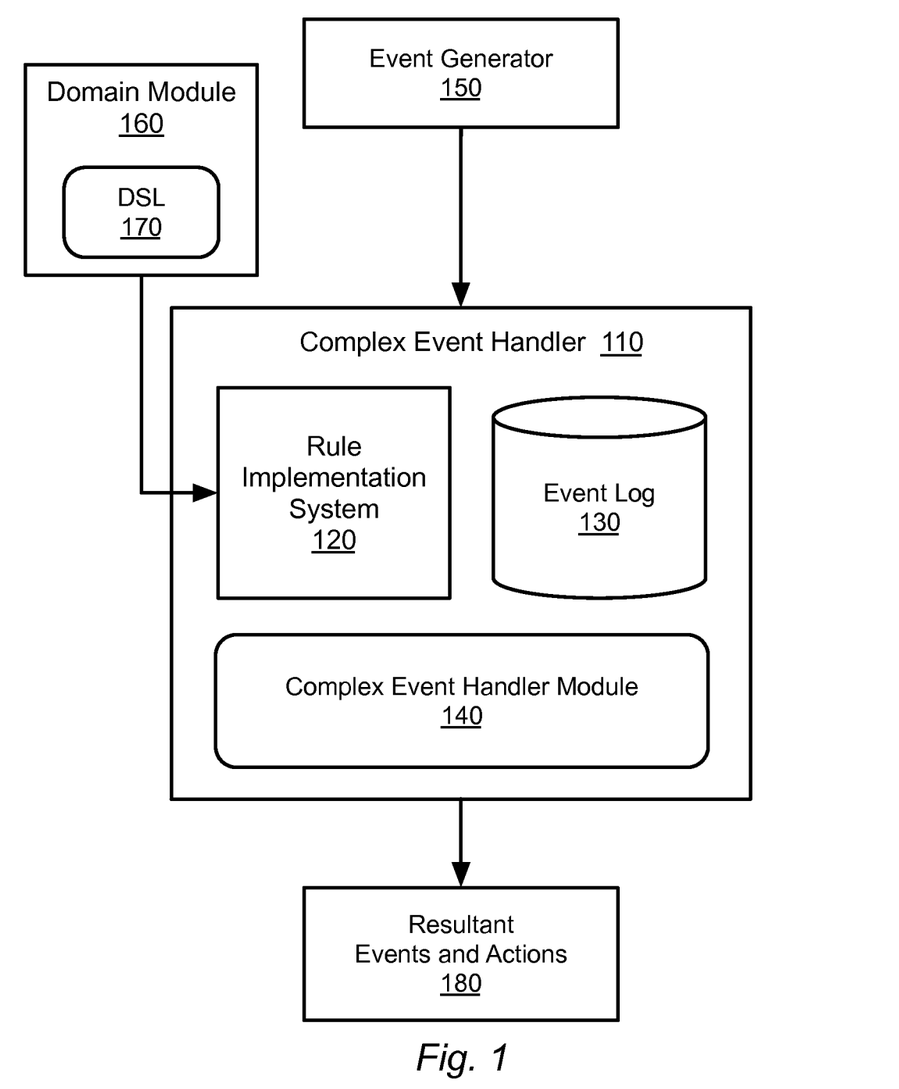
FIG. 1 is a block diagram depicting a complex event handler associated with a rule implementation system and an event log in accordance with one or more embodiments presented herein.

FIG. 1 is a block diagram depicting a complex event handler 110 associated with a rule implementation system 120 and an event log 130 in accordance with one or more embodiments presented herein. The complex event handler 110 can execute in association with a complex event handler module 140. The complex event handler 110 can receive incoming events from one or more event generators 150. The complex event handler 110 can store incoming events to the event log 130. The complex event handler 110 can match incoming events against rules within the rule implementation system 120. Triggering of the rules within the rule implementation system 120 may also be dependent upon prior events stored in the event log 130. Triggering of rules can generate resultant events and actions 180. One or more domain modules 160 may provide rules for use within the rule implementation system 120. A domain specific language (DSL) 170 may be used in conjunction with each of the domain modules 160.

The complex event handler 110 and associated complex event handler module 140 can receive incoming events from one or more event generators 150. The complex event handler 110 can support making decisions based one or more incoming current events in combination with one or more prior events. The decisions may be determined by the rule implementation system 120 based upon incoming events along with prior events stored within the event log 130.

In addition to the rule implementation system 120 triggering rules based upon incoming events, rules associated with the complex event handler 110 may further depend upon prior events retrieved form the event log 130. The condition of such a rule may be a function of both current incoming events as well as prior events.

According to one or more examples related to an enterprise messaging system, a current event may be generated when user Adam sends a first message to user Beth, both within the same organization. The complex event handler 110 may store, within the event log 130, an event indicating that the first message was sent. Subsequently, user Beth's role within the organization may change. For example, Beth may have been in charge of deliveries on the day when the first message was sent, but is now in charge of customer service. The change in Beth's role may generate an event that may be stored by the complex event handler 110 into the event log 130. At a future point, user Adam may send a second message to user Beth. Sending the message may generate an event, which is received by the complex event handler 110. The complex event handler 110 may trigger a rule within the rule implementation system 120. The complex rule may be a function of both the incoming event (a second message was sent) and two prior events (a first message was sent and the role associated with the receiver has changed). The two prior events may be retrieved from the event log 130 by the rule implementation system 120 while testing the rule. The rule may indicate that if user Adam sends a first message to user Beth, user Beth's role changes, and then user Adam sends a second message to user Beth, one or more actions should alert one or both of the users Adam and Beth to these details. For example, the rule implementation system 120 may generate an action to notify user Adam that user Beth has changed roles within the organization since their last interaction. The rule implementation system 120 may also generate an action to notify user Beth that user Adam sent a message and has been notified of Beth's new role. User Beth may also be provided the opportunity to redirect the second message to the new person in her prior role, if appropriate. Furthermore, user Beth may be provided with an option to ignore the message or to simply continue the conversation with user Adam.

It should be appreciated that rules associated with the complex event handler 110 can act on multiple incoming current events from multiple sources as well as depending upon multiple prior events retrieved from the event log 130. A rule may be a function of any number of incoming current events and any number of prior events.

The rule implementation system 120 may be an example of a rule engine system, production system, or production rule system. These are often used in artificial intelligence, automated planning, expert systems, action selection systems, or other such machine-based knowledge or decision systems.

The rule implementation system 120 may implement a plurality of rules. Each rule may contain a condition that when matched triggers a resultant action. The rule implementation system 120 may receive events that can be pattern-matched against the rule conditions. When a rule condition is properly matched to incoming events and/or stored prior events, the rule action associated with the condition may be triggered. The rule condition may be specifically formatted to match the formatting of the event data associated with incoming events and/or prior events stored within the event log 130.

According to various embodiments, incoming and stored events may be specifically formatted into a standardized canonical form to match the formatting of the rule condition. Similarly, the rule conditions may be structured or formed to match the same canonical formatting. Such formatting not only simplifies the insertion process, it may also empower operation of the rule implementation system 120. Since earlier events preceding later events can influence updates, it may be important to apply versioning techniques as presented herein to information within the event log 130. The ordering of such versioned information in the event log 130 may further facilitate the sorting/insertion process and operations of the rule implementation system 120.

The event log 130 may store one or more events received by the complex event handler 110. The event log 130 can store events within a computerized database, a computer memory, a computer data storage system, a cloud-based data store, any other data storage mechanisms, or any combinations thereof. Events may be time-stamped and/or date-stamped in order to establish when the complex event handler 110 received respective events. According to various embodiments, stored prior events may be removed from the event log 130 when they reach a specified expiration date. Similarly, a rule may trigger indicating removal of the event entry from the event log 130. A given rule may also indicate a specified time window of prior events to be considered when evaluating the condition of the rule. According to various embodiments, the time-stamp may indicate a received time, a creation time, or a time associated with some related event. Furthermore, the time-stamp may be delayed or offset by some known, determinable, or computed amount. Such time specifics may be particularly meaningful important for processing fine-grained timing and/or batched log event delivery.

The resultant events and actions 180 may be generated as a result of triggering rules within the rule implementation system 120 in association with the complex event handler 110. When events match the patterns of a rule condition within the rule implementation system 120, that rule may be triggered generating an action. The action may include the generation of, or cause the generation of, a new event. The complex event handler 110 may itself process that new event, which may include storing the event in the event log 130 and/or trigger rules within the rule implementation system 120 that match the new event. The actions may also impact or instruct operations of one or more other systems.

The event generator 150 may generally be any source of events that may be processed by the complex event handler 110. One example event generator 150 according to an example enterprise messaging system may be the transmission of a message from one user to another user. Another example event generator 150 according to an example healthcare enterprise system may the generation of a notification to a member of the nursing staff when an alarm has been generated by a piece of patient instrumentation.

A domain specific language 170 may be specified for use within a particular knowledge domain. Examples of knowledge domains in a healthcare context may include pharmacy, nursing, radiology, cardiology, and so forth. The domain specific language 170 may be used in conjunction with one or more of the domain modules 160 to support specifying rules for use within the rule implementation system 120. Domain users and/or domain experts may provide rules expressed using their respective domain specific language 170. The rules may be provided in plain text, speech-to-text, or some other format. The rules may also be provided through a graphical user interface, wherein the rules may be constructed using elements of the domain specific language 170. The domain specific language 170 may inform structure, parameters, or other information used in the canonical or standardized event log entries. Similarly, known standard formats may inform use of the domain specific language 170. For example, events associated with a domain specific language for a pharmacy domain may generally include dosage, mass, and timing for pharmaceutical agents, thus informing the inclusion of such parameters in logged events.

The domain module 160 can support inputs using the domain specific language 170 for defining rules within the rule implementation system 120. Each given domain can be given a custom domain specific language 170. Because the domain specific language 170 can be user friendly to a domain user, and generally quite specific to that given domain, the domain experts generally do not need to be familiar with operational details of the complex event handler 110 or the rule implementation system 120. A condition generator functionality associated with the domain module 160 may process inputs expressed in the domain specific language 170 into a format for insertion as a rule into the rule implementation system 120. Similarly, an action generator functionality associated with the domain module 160 may process inputs expressed in the domain specific language 170 to extract resultant actions associated with the rule being triggered within the rule implementation system 120.

Figure 5:
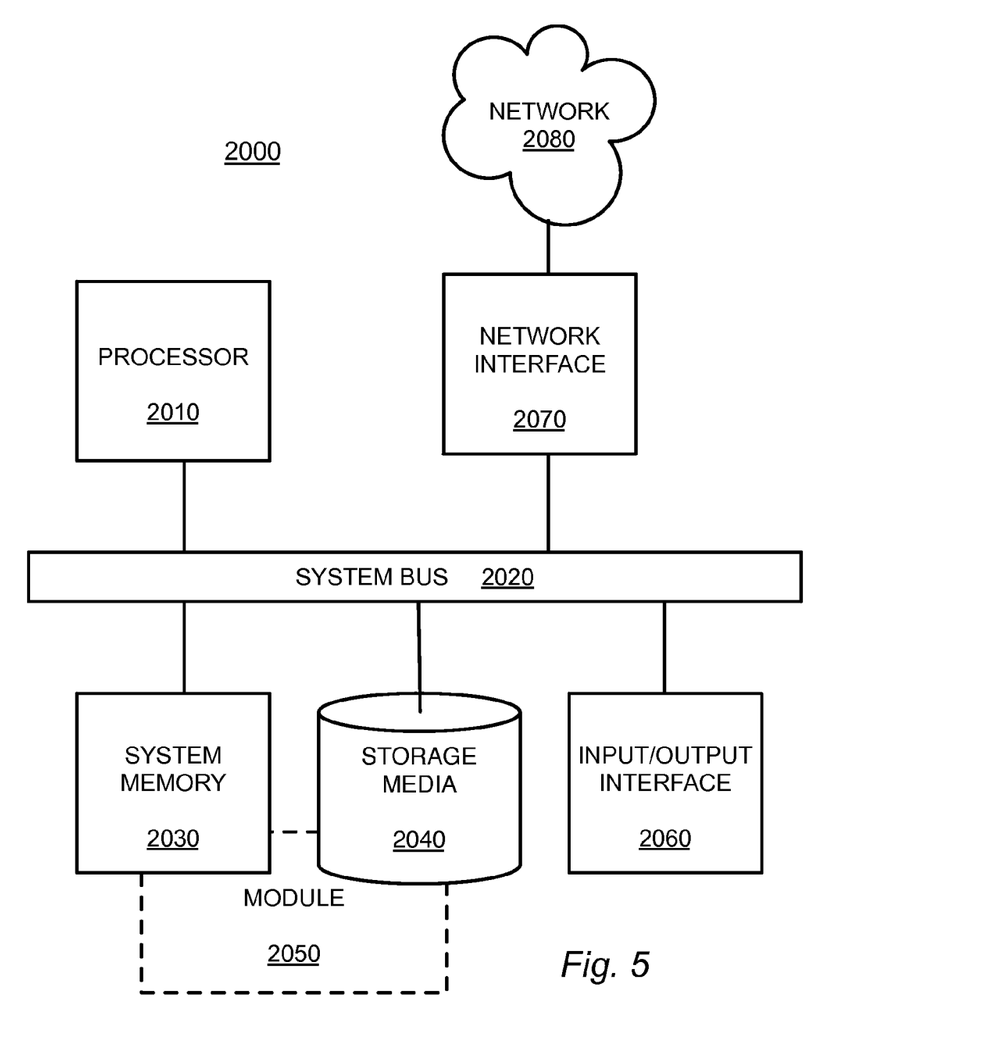
FIG. 5 is a block diagram depicting a computing machine and a module in accordance with one or more embodiments presented herein.

The complex event handler 110, the rule implementation system 120, systems associated with the event generators 150, systems associated with the domain module 160, systems associated with the resultant events and actions 180, or any other systems associated with the technology presented herein may be any type of computing machine such as, but not limited to, those discussed in more detail with respect to FIG. 5. Furthermore, any modules (such as the complex event handler module 140, or domain module 160) associated with any of these computing machines or any other modules (scripts, web content, software, firmware, or hardware) associated with the technology presented herein may by any of the modules discussed in more detail with respect to FIG. 5. The computing machines discussed herein may communicate with one another as well as other computer machines or communication systems over one or more networks. These networks may include any type of data or communications network including any of the network technology discussed with respect to FIG. 5.

Figure 2:
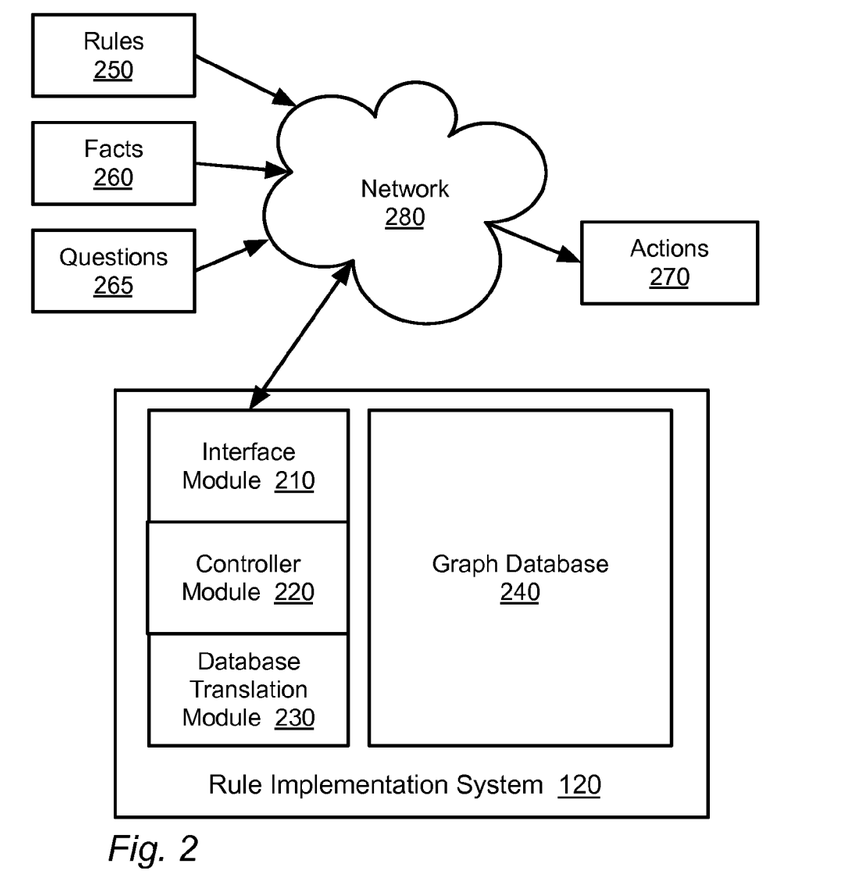
FIG. 2 is a block diagram depicting a rule implementation system associated with a graph database in accordance with one or more embodiments presented herein.

FIG. 2 is a block diagram depicting a rule implementation system 120 associated with a graph database 240 in accordance with one or more embodiments presented herein. This example rule implementation system 120 can operate within the complex event handler 110 to match incoming and prior events to trigger resultant events and actions 180. The rule implementation system 120 can operate on rules 250 and facts 260 to respond to questions 265 or to establish additional rules 250, additional facts 260, or trigger actions 270. It should be appreciated that in this context, the facts 260 may be incoming and prior events associated with the complex event handler 110. The rule implementation system 120 can include various modules such as an interface module 210, a controller module 220, and a database translation module 230. The rule implementation system 120 can operate directly within, or in conjunction with, a graph database 240. Rules 250, facts 260, questions 265 or actions 270 associated with the rule implementation system 120 may be communicated directly to or from the rule implementation system 120. These communications may also occur in conjunction with one or more networks 280.

A rule 250 associated with the rule implementation system 120 generally consists of two components: a condition and a result (or action 270). The condition and result (or action 270) of a rule 250 may be said to have an "if, then" relationship. If the condition obtains, then the rule 250 is triggered causing the result (or action 270) to be fired. The condition generally obtains by the existence, or truth, of one or more facts 260. For example, a condition could be, "if it is Wednesday," which would trigger when presented with the fact that the day of the week is Wednesday. The result of firing a rule 250 generally involves one or more other facts 260 or the generation of an action 270. Firing of the rule 250 can assert or retract one or more other facts 260. Firing of the rule 250 can also generate one or more actions 270 as output of the rule implementation system 120. Asserting or retracting one or more facts 260 can alter the state of the rule implementation system 120, which may then affect the conditions of other rules 250 causing them to fire. Altering the state of the rule implementation system 120 may also affect the responses provided to questions 265 processed by the rule implementation system 120.

The graph database 240 can provide the working memory of the rule implementation system 120. This working memory can store information comprising the current state or knowledge of the rule implementation system 120. The graph database 240 can store information in a graph structure where nodes are interconnected by edges. The nodes generally represent entities or things such as individuals, departments, or equipment. Edges generally connect nodes representing the relationship between them. Each node may be associated with one or more properties, which may contain information pertinent to that respective node.

The interface module 210 of the rule implementation system 120 can provide an application programming interface (API), scripting interface, domain-specific language (DSL) 170, or other mechanism for interfacing to the rule implementation system 120. The interface module 210 may support transactions with other modules, systems, or entities associated with the rule implementation system 120. These transactions may involve providing rules 250 or facts 260 to the rule implementation system 120, receiving and reacting to questions 265, retrieving rules 250 or facts 260 from the rule implementation system 120, or receiving actions 270 or information associated with actions 270 from the rule implementation system 120.

The controller module 220 of the rule implementation system 120 can process control operations of the rule implementation system 120. Examples of the operations may include executing queries, starting/stopping rule evaluation, and so forth.

The database translation module 230 of the rule implementation system 120 can provide low-level interactions with the graph database 240. These interactions may include performing queries, handling fact node assertion or retraction, database administrative tasks, and so forth.

It should be appreciated that in addition to the interface module 210, controller module 220, database translation module 230, and graph database 240, the rule implementation system 120 may include or interface with other modules. It should also be appreciated that any two or more of these modules may be combined into the same module or modules. Furthermore, any one or more of these modules may split functionally, or load share, between two or more modules or execute on two or more computing machines. Any such modules may operate in a parallel, distributed, or networked fashion without departing from the spirit or scope of the technology presented herein.

Within the rule implementation system 120, a rule-fact graph may be a graph stored in the graph database 240. The rule-fact graph can include various nodes connected by edges. The rule-fact graph within the graph database 240 can serve as the working memory of the rule implementation system 120. This working memory can store information comprising the current state or knowledge of the rule implementation system 120. This information can include various facts 260, which may be stored as nodes connected by edges representing relationships between the nodes such that the nodes and edges together can encode the rules 250.

Within the rule implementation system 120, rule interpretation may be provided by executing queries on the rule-fact graph within the graph database 240. The queries may be associated with questions 265 posed to the rule implementation system 120. The queries and questions 265 may relate to incoming and prior events. The queries can pattern-match facts 260 against the encoded rules 250 determining which of the rules 250 to apply. The condition portion of each rule 250 may be tested against the current state of the working memory by pattern matching against the rule-fact graph. The consequent results can update the knowledge represented by the rule-fact graph by asserting or retracting information. The consequent results can also update the event knowledge by generating an event that will in turn be stored to the event log 130. Rule interpretation can execute forward chaining when updated information affects other rules 250 implied within the rule-fact graph. The results consequent to the condition can also trigger actions 270 which may include generating new events. Queries of the rule-fact graph within the graph database 240 can leverage a schema-free storage structure supporting index-free adjacency where any node may be directly linked (by one or more edges) to its adjacent nodes such that index lookups are unnecessary.

Within the rule implementation system 120, representing rules 250 within the graph database 240 provides the ability to establish adjacencies between any nodes (and thus relationships between facts 260) without having to rebuild schemas or introduce associating tags or indices. Accordingly, rules 250 may be changed or introduced anew within the rule-fact graph very efficiently and with reduced effort or overhead. Changing this rule representation in a traditional database for a huge number of entries can be extremely time consuming and nearly impossible, if such rules changed as frequently as they might in certain complex enterprise environments such as health care information systems.

Some example benefits to the rule implementation system 120 leveraging the graph database 240 relate to it being more suitable for managing ad hoc and changing data with evolving schemas. For example, in a healthcare enterprise such as a hospital department, the number of nurses may vary from shift to shift, as might the number of patients. Furthermore, the roles of the nurses may change and the assignments relating the nurses to specific patients may also change. When additional facts 260 and rules 250 associated with the hospital department come into play, the rule-fact graph can quickly become very large even while being dynamic (rapidly changing). For example, the additional events, facts 260, and rules 250 may relate to procedures, medications, food service, radiology, tests, specialist referrals, admit/discharges, code emergencies, monitoring alarms, and so forth. Other example additional events, facts 260, and rules 250 may relate to routing messages, alarms, notifications, voice calls, text messages, or other communication modalities to one or more nurses (or wireless mobile devices associated therewith) within a healthcare enterprise. This type of information is also well addressed by the schemaless structure support of the rule implementation system 120 and its associated graph database 240.

Another example benefit to the rule implementation system 120 leveraging the graph database 240 stems from the native pattern matching capabilities of the graph database 240. Such native pattern matching support can provide for significant increases in efficiencies related to rule interpretation and associated queries.

Yet another example benefit to the rule implementation system 120 leveraging the graph database 240 relates to the disk-backed performance of the rule implementation system 120 and its associated graph database 240. Disk-backed operation can provide persistence of state by maintain information within the graph database 240. Disk-backed operation can also overcome working memory limitations encountered in operating on a rule-fact graph of ever increasing size and complexity. It should be appreciated that this "working knowledge" associated with the rule-fact graph maintains rules and is in contrast to the prior event knowledge stored in the event log 130.

The rule implementation system 120, systems associated with the rules 250, facts 260, or actions 270, or any other systems associated with the technology presented herein may be any type of computing machine such as, but not limited to, those discussed in more detail with respect to FIG. 5. Furthermore, any modules (such as the interface module 210, controller module 220, or database translation module 230) associated with any of these computing machines or any other modules (scripts, web content, software, firmware, or hardware) associated with the technology presented herein may by any of the modules discussed in more detail with respect to FIG. 5. The computing machines discussed herein may communicate with one another as well as other computer machines or communication systems over one or more networks such as network 280. The network 280 may include any type of data or communications network including any of the network technology discussed with respect to FIG. 5.

Figure 3:
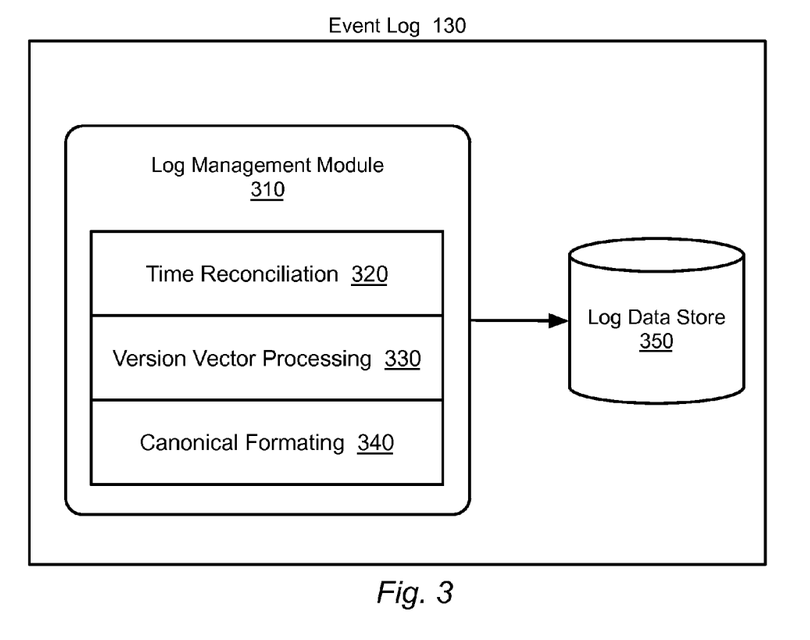
FIG. 3 is a block diagram depicting an event log comprising a log management module and a log data store in accordance with one or more embodiments presented herein.

FIG. 3 is a block diagram depicting an event log 130 comprising a log management module 310 and a log data store 350 in accordance with one or more embodiments presented herein. The log management module 310 may include a time reconciliation 320 sub-module, a version vector processing 330 sub-module, and a canonical formatting 340 sub-module. The events received by the event log 130 may be time reconciled, version vector processed, and canonically formatted by the log management module 310. The received events may also be stored in the log data store 350 associated with the event log 130.

Events may generally be any record or indication of an occurrence within a context of interest to a system. The events may originate from one or more event generators 150. The events may be transferred to the event log 130 for storage by the complex event handler 110. According to certain embodiments, the events may also be transferred to the event log 130 for storage by various other systems or sources.

For example, in a healthcare enterprise, events may indicate occurrences associated with nurses, patients, and other entities. Occurrences associated to relationships between such entities may vary from shift to shift thereby generating and updating events. These events may be generated when the roles and assignments of the nurses or conditions of the patients change. Additional events may be generated by regular monitoring of and changes in procedures, medications, food service, radiology, tests, specialist referrals, admit/discharges, code emergencies, alarms, and so forth. Other example events may relate to occurrences of routing messages, alarms, notifications, voice calls, text messages, or other communication modalities to one or more nurses within a healthcare enterprise. Accordingly, the event log 130 may store a great deal of information that may be highly dynamic or otherwise frequently updated.

The log management module 310 may receive and process the events in the event log 130. Such processing may include time reconciliation, vector versioning, and canonical formatting. The log management module 310 may also store processed events in the log data store 350. The log management module 310 may include various sub-modules including, but not limited to, a time reconciliation 320 sub-module, a version vector processing 330 sub-module, and a canonical formatting 340 sub-module.

The time reconciliation 320 sub-module can analyze the time/datestamp associated with a received event. The time reconciliation 320 sub-module may include pre-processors specific to each type or format of log entry being ingested to determine and reconcile the time-zone and any time offset associated with each log source. The time reconciliation 320 sub-module may adjust the log entry to account for clock skew between systems to facilitate relative time ordering of log entries. The time reconciliation 320 sub-module may append a reconciled time/datestamp to the event and may also maintain the original time/datestamp for reference in subsequent processing and sorting of the event log.

Version vector processing 330 can analyze and update a versioning vector associated with an event. A versioning vector is a mechanism for tracking changes to events from multiple sources with multiple updates in a distributed system. Local versioning vectors may be created at each source and may combine the multiple versions of an event to form a tuple (an ordered set). Based on the elements within the local versioning vectors, the log management module 310 can determine an ordering of events. Furthermore, multiple sources may run their own local versioning progressions without having to impose a lock across the disparate source systems each time the version is increased at any one of the sources, thus maintaining a lock-free ordering of events. The version vectors may be referred to as orthogonal versions or orthogonal version vectors.

Versioning vectors track the events that precede, and may therefore influence, later event updates. To illustrate how versioning vectors may be processed, suppose a first system (referred to as system A) can act as an event generator 150 and reports events to a complex event handler 110 comprising an event log 130. As system A generates events, is desirable to keep those events synchronized with events stored within the event log 130. As events, or updated events, are generated by system A, they may be tagged with new version indicators. The new, or updated, events may be sent to the complex event handler 110 and thus may need to be recorded to the event log 130. The event log 130 may have been initialized or reinitialized with a snapshot of the entire event state of system A at some point in time. As the event log 130 is updated with events from system A, the new or updated events should be stored to the event log 130 in the correct order with respect to themselves and also to other entries within the event log 130.

In a simplest case where all events from system A have strictly increasing version numbers, the event updates supplied to the event log 130 can simply be sorted by these version numbers, with snapshots carrying the most recent version number at the time of their generation. However, system A may have events with diverse version sourcing or system A may be divided into several subsystems. These may be considered partitions where each can assign its local version numbers internally, and the version numbers between any two partitions may be uncorrelated. These partitions of A may be referred to as $A_1, A_2, \ldots A_n$. Assuming system A can be partitioned such that event versions may be unique between partitions, then a versioning vector $v=[s_1, s_2, s_n]$ may be created according to the two rules. A first rule that v is the versioning vector of each current version number for all $A_i$ given a snapshot of system A. And a second rule that, for an update affecting only $A_i$, is $[ø, ø, s_i, \ldots ø]$, where ø is a special 'null' value which does not otherwise occur as a version number. An operation m on may be defined over pairs of version numbers:

$$m(x,y)=\max(x,y)$$

$$m(x,ø)=x$$

$$m(ø,y)=y$$

$$m(ø,ø)=ø$$

And an operation M may be defined over pairs of versioning vectors:

$$M(u,v)=[m(u_1,v_1),m(u_2,v_2), \ldots m(u_n,v_n)]$$

Comparisons $\prec$ and $\succ$ may be defined between version numbers:
  $x \prec y$ when $x \neq ø$ and $y \neq ø$ and $x<y$
  $x \succ y$ when $x \neq ø$ and $y \neq ø$ and $x>y$
And comparisons $\preccurlyeq$ and $\succcurlyeq$ may be defined between versioning vectors:
  $u \succcurlyeq v$ when no $u_i \prec v_i$ for any i and $u_j \succ v_j$ for some j.
  $u \preccurlyeq v$ when no $u_i \succ v_i$ for any i and $u_j \prec v_j$ for some j.
If the event log 130 starts in a blank state, it may be assigned the initial versioning vector $v_0=[ø, ø, \ldots ø]$. Given a sequence of updates with versioning vectors $u_1, u_2, u_3 \ldots$, the event log 130 may have versioning vectors $v_1, v_2, v_3 \ldots$ where $$v_i=M(u_i,v_{i-1})$$

and $u_i$ is applied whenever $u_i \succcurlyeq v_{i-1}$.

It should be appreciated that certain event entries within the event log 130 may be versioned, some may have timestamps, and some may have both versioning vectors and timestamps. The log management module 310 can handle, and attempt to unify, these diverse event sources and version or ordering formats.

Canonical formatting 340 can generate canonical, or standardized, log records. Event header timestamps may be adjusted and standardized by the canonical formatting 340 sub-module. Sub-second time offsets associated with events may be included in the normalized event header to facilitate relative time ordering of event entries into the event log 130. Sub-sequence numbers may also be included in the normalized event header to facilitate multi-line, or other cumbersome format, entries. Such sub-second time offsets and sub-sequence numbers may be incorporated into events stored to the event log 130.

After received events are processed by the log management module 310, they may be recorded to the event log data store 350. The event log data store 350 may be one or more computer files, alphanumerical lists, databases, or the like and may be stored on media locally, in a central sever, in a distributed computer system, or in storage media made available in a private or public cloud.

The events stored in log data store 350 may subsequently be presented to the complex event handler 110 for further handling and processing to support making decisions determined by the rule implementation system 120. In this manner, the functionality of the log management module 310 and its associated sub-modules, together with log data store 350, can support operation of the complex event handler 110 and the rule implementation system 120.

It should be appreciated that in addition to supporting the complex event handler 110 and the rule implementation system 120, the log management module 310 along with the related technology presented herein may support various other applications without departing from the intended spirit or scope. For example, the event log 130 technology presented herein may be used to synchronize, combine, reconcile, and manage various types of logs, journals, tracking systems, lists, or any other application where records are collected from diverse, distributed sources to be joined into a consistent, ordered, or otherwise coordinated collection.

Example Processes

According to methods and blocks described in the embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

Figure 4:
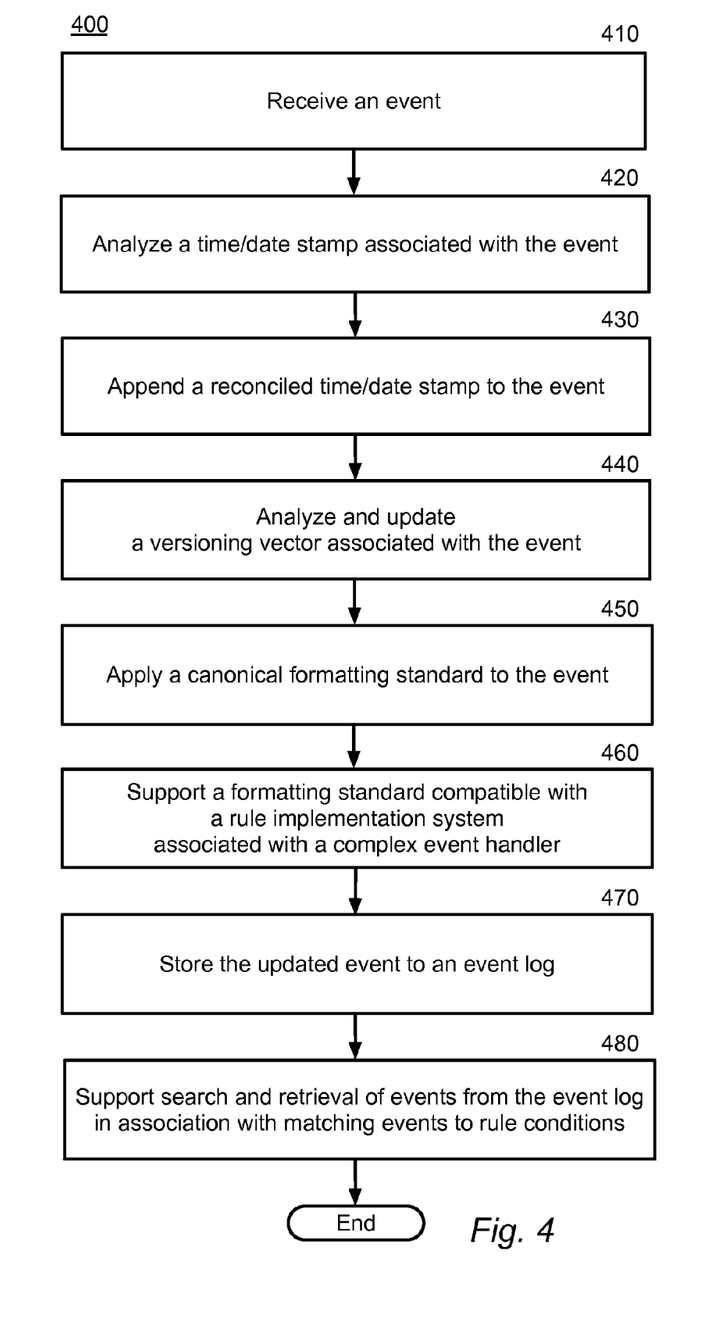
FIG. 4 is a block flow diagram illustrating a method for processing events to support event log search and retrieval associated with rule implementation in accordance with one or more embodiments presented herein.

FIG. 4 is a block flow diagram illustrating a method 400 for processing events to support event log search and retrieval associated with rule implementation in accordance with one or more embodiments presented herein.

In block 410, the complex event handler 110 can receive an event. The event may be sourced from an event generator 150. The complex event handler 110 can processed the received events according to the complex event handler module 140.

In block 420, time reconciliation 320 may be carried out in association with the log management module 310. A time/date stamp associated with the event received by the complex event handler 110 may be read and analyzed. Analysis of the time/date stamp may include determination and reconciliation of the time-zone, clock skew, other time offset, other variation in time encoding or representation, or any combination thereof. Time reconciliation 320 may comprise analysis of various temporal indicators associated with the event. These temporal indicators may include a timestamp, a version number, a versioning vector, know clock skews, receipt time of the event indicator, relative orderings, and so forth.

In block 430, a reconciled time/date stamp may be appended to the received event according to the time reconciliation 320 sub-module. The reconciled timestamp may also be referred to as a synchronized timestamp. The synchronized timestamp can synchronize newly received event indicators with stored prior event indicators within the event log 130. The appended time/date stamp can support maintaining a relative time ordering of events within the event log 130 even when those events arrive from disparate sources using offset, skewed, or diversely represented times. The original time/date stamp may also be maintained with the event for reference in subsequent processing and sorting of the event log 130.

In block 440, the version vector processing 330 can analyze and update a versioning vector associated with an event. Versioning vectors may be used to coordinate ordered insertion of events into an event log 130 that may be generated by multiple disparate event sources in a distributed, unsynchronized fashion. Local versioning vectors may be created at each source and may combine the multiple versions of an event to form a tuple. Based on the elements within the local versioning vectors, the log management module 310 can determine an ordering of events. Furthermore, multiple sources may run their own local versioning progressions without having to impose a lock across the disparate source systems each time the version is increased at any one of the sources, thus maintaining a lock-free ordering of events.

In block 450, canonical formatting 340 can generate canonical, or standardized, log record formats. Event timestamps may be analyzed for adjustment and standardization. Time offsets associated with events may reconcile variations in time-zone, clock skew, other time offset, other variation in time encoding or representation, or any combination thereof. Sub-sequence indicators may also be included in the canonical event format to facilitate handling multi-line, or other cumbersome format, entries. Such standardization of events can support meaningful integration of received events into the event log 130.

In block 460, canonical formatting 340 can support a formatting standard compatible with the rule implementation system 120 associated with the complex event handler 110. Received events may be specifically formatted into one or more standardized canonical form corresponding to the forms associated with the rule conditions. Similarly, the rule conditions may be structured or formatted to match the same canonical form. Such standardization not only simplifies the ordered insertion of events into the event log 130, but may also empower operation of the rule implementation system 120 by supporting more meaningful and efficient search and retrieval of prior events from the event log 130.

In block 470, the log management module 310 can store the received event into the log data store 350. The analysis and processing of the received event presented herein can simplify the ordered insertion of events into the event log 130 while also improving meaningful and efficient searching and retrieval of prior events from the event log 130.

In block 480, the log management module 310 can support search and retrieval of events stored in log data store 350 as associated with the event log 130. Retrieved prior events may be used to test rule conditions associated with the rule implementation system 120 according to the complex event handling technology presented herein presented herein. Triggering a rule 250 may occur in response to satisfying the rule condition associated with the rule 250. The rule condition may have a stored event dependency defining how the rule condition includes a dependency upon one or more stored prior event indicators. Satisfying the rule condition can comprise matching a retrieved event indicator against such a stored event dependency.

Example Systems

FIG. 5 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of embodiments of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for log synchronization within a complex event handler, comprising:
receiving an event by the complex event handler, wherein the complex event handler is associated with a healthcare communications system within a healthcare facility and the event is associated with the healthcare facility;
analyzing, by the complex event handler, temporal indicators associated with the event to establish consistent relative ordering with respect to other events;
generating, by the complex event handler, a synchronized timestamp in response to analyzing the temporal indicators;
translating, by the complex event handler, the event into a canonical form;
storing, by the complex event handler, the translated event into an event log according to the synchronized timestamp;

evaluating, by the complex event handler, a rule associated with a rule implementation system to identify a stored event dependency within a rule condition of the rule;

supporting, by the complex event handler, search and retrieval of the translated event from the event log while matching the translated event against the stored event dependency;

triggering, by the complex event handler, the rule in response to satisfying the rule condition, wherein satisfying the rule condition comprises matching the translated event against the stored event dependency; and generating, by the complex event handler, an action associated with the rule in response to triggering the rule, wherein the action is associated with a wireless mobile device within the healthcare facility.

2. The computer-implemented method of claim 1, wherein the canonical form corresponds to a form associated with the rule condition.

3. The computer-implemented method of claim 1, wherein the temporal indicators comprise a timestamp within the event.

4. The computer-implemented method of claim 1, wherein the temporal indicators comprise a version associated with the event.

5. The computer-implemented method of claim 1, wherein the temporal indicators comprise an orthogonal version vector associated with the event.

6. The computer-implemented method of claim 1, wherein the temporal indicators comprise a clock skew.

7. The computer-implemented method of claim 1, wherein the temporal indicators comprise an orthogonal version vector operable to track a lock-free relative ordering of occurrences from two or more unsynchronized sources.

8. The computer-implemented method of claim 1, wherein the event indicates a patient alarm occurrence within the healthcare facility.

9. The computer-implemented method of claim 1, wherein the event indicates an occurrence associated with one of a voice communication, an alarm, and a notification.

10. The computer-implemented method of claim 1, wherein the automated rule system comprises a graph database.

11. A log synchronization system, comprising:
one or more processing units, and one or more processing modules, wherein the log synchronization system is configured by the one or more processing modules to:
receive an event indicator, wherein the indicated event is associated with a healthcare communications system within a healthcare facility;
analyze temporal indicators associated with the event indicator to establish consistent relative ordering with respect to other events;
generate a synchronized timestamp in response to analyzing the temporal indicators;
translate the event indicator into a canonical form;
store the translated event indicator into an event log according to the synchronized timestamp;
evaluate a rule associated with a rule implementation system to identify a stored event dependency within a rule condition of the rule;
retrieve the translated event indicator from the event log while matching the translated event indicator against the stored event dependency;

trigger the rule in response to satisfying the rule condition, wherein satisfying the rule condition comprises matching the translated event indicator against the stored event dependency; and performing an action in response to triggering the rule, wherein the action is associated with a wireless mobile device within the healthcare facility.

12. The automated rule implementation system of claim 11, wherein the event log comprises an organized collection of prior event indicators.

13. The automated rule implementation system of claim 11, wherein the canonical form corresponds to a form associated with the rule condition.

14. The automated rule implementation system of claim 11, wherein the temporal indicators comprise a timestamp associated with the event indicator.

15. The automated rule implementation system of claim 11, wherein analyzing the temporal indicators comprises evaluating a time zone associated with the event indicator.

16. The automated rule implementation system of claim 11, wherein the temporal indicators comprise an orthogonal version vector operable to establish a lock-free relative ordering of occurrences from two or more unsynchronized sources.

17. The automated rule implementation system of claim 11, wherein the automated rule system comprises a graph database.

18. The automated rule implementation system of claim 11, wherein the event indicator is associated with mobile communication devices operating within a healthcare enterprise.

19. The automated rule implementation system of claim 11, wherein the event indicator is associated with one of a voice communication, an alarm, and a notification.

20. A computer program product, comprising:
a non-transitory computer-readable storage medium having computer-readable program code embodied therein that, when executed by one or more computing devices, perform a method comprising:
providing an event log for storing prior event indicators;
receiving a new event indicator, wherein the indicated event is associated with a healthcare communications system within a healthcare facility;
analyzing temporal indicators associated with the new event indicator to establish consistent relative ordering with respect to the prior event indicators, wherein the temporal indicators comprise one of a timestamp and an orthogonal version vector;
generating a synchronized timestamp in response to analyzing the temporal indicators;
translating the new event indicator into a canonical form;
storing the translated event indicator into the event log according to the synchronized timestamp;
evaluating a rule associated with a complex event handling system to identify a stored event dependency within a rule condition of the rule;
querying the event log for the stored event dependency;
triggering the rule in response to satisfying the rule condition, wherein satisfying the rule condition comprises matching the stored event dependency against the event log; and
performing an action in response to triggering the rule, wherein the action is associated with a wireless mobile device within the healthcare facility.

* * * * *